United States Patent
Lee et al.

(10) Patent No.: US 7,573,685 B2
(45) Date of Patent: *Aug. 11, 2009

(54) GMR SENSOR HAVING A CAPPING LAYER TREATED WITH NITROGEN FOR INCREASED MAGNETORESISTANCE

(75) Inventors: Wen-yaung Lee, San Jose, CA (US); Thomas E. Shatz, Morgan Hill, CA (US); Dulip Ajantha Welipitiya, Morgan Hill, CA (US); Brian R. York, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 8 days.

This patent is subject to a terminal disclaimer.

(21) Appl. No.: 11/769,533

(22) Filed: Jun. 27, 2007

(65) Prior Publication Data

US 2007/0247764 A1    Oct. 25, 2007

Related U.S. Application Data

(63) Continuation of application No. 11/039,085, filed on Jan. 18, 2005, now Pat. No. 7,251,110.

(51) Int. Cl.
*G11B 5/39* (2006.01)

(52) U.S. Cl. .................................. 360/324.1

(58) Field of Classification Search .............. 360/324.1, 360/324.2, 324.11, 324.12
See application file for complete search history.

(56) References Cited

U.S. PATENT DOCUMENTS

| | | | | |
|---|---|---|---|---|
| 6,157,525 A * | 12/2000 | Iwasaki et al. | ......... | 360/324.12 |
| 6,407,892 B2 * | 6/2002 | Shiroishi | ..................... | 360/317 |
| 2002/0150675 A1 * | 10/2002 | Everitt et al. | ................. | 427/128 |
| 2003/0146186 A1 * | 8/2003 | Kanakubo et al. | ............. | 216/20 |
| 2003/0199106 A1 * | 10/2003 | Durcan et al. | .................. | 438/3 |
| 2004/0052004 A1 * | 3/2004 | Nakayama | .................. | 360/313 |
| 2004/0101702 A1 * | 5/2004 | Kim et al. | .................... | 428/492 |
| 2004/0161636 A1 * | 8/2004 | Hujanen et al. | ............. | 428/692 |
| 2005/0110004 A1 * | 5/2005 | Parkin et al. | .................. | 257/30 |
| 2005/0254180 A1 * | 11/2005 | Kanakasabapathy et al. | ....................... | 360/324.2 |
| 2005/0259365 A1 * | 11/2005 | Singleton et al. | ......... | 360/324.1 |
| 2005/0277206 A1 * | 12/2005 | Gaidis et al. | ................... | 438/3 |
| 2005/0280933 A1 * | 12/2005 | Nakayama | .................. | 360/122 |
| 2005/0282295 A1 * | 12/2005 | Raberg | .......................... | 438/3 |

* cited by examiner

*Primary Examiner*—Jefferson Evans
(74) *Attorney, Agent, or Firm*—Zilka-Kotab, PC

(57) ABSTRACT

A magnetoresistive sensor having a Ta cap layer with nitrogen added in situ during deposition. The nitrogen in the cap layer can be formed by depositing a Ta cap layer in a sputter deposition chamber having a small amount of nitrogen in an Ar atmosphere. The resulting nitrogenated cap layer exhibits reduced specular scattering, which results in improved magnetic performance of the magnetoresistive sensor.

17 Claims, 4 Drawing Sheets

GMR SENSOR HAVING A CAPPING LAYER TREATED WITH NITROGEN FOR INCREASED MAGNETORESISTANCE

RELATED INVENTIONS

This application is a continuation of commonly assigned U.S. patent application Ser. No. 11/039,085, filed Jan. 18, 2005 now U.S. Pat. No. 7,251,110, entitled GMR SENSOR HAVING LAYERS TREATED WITH NITROGEN FOR INCREASED MAGNETORESISTANCE, which is incorporated herein by reference.

FIELD OF THE INVENTION

The present invention relates to the manufacture of magnetoresistive sensors and more particularly to the surface treatment of selected layers with Nitrogen to improve magnetoresistive performance in the sensor.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a space layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

The ever increasing demand for data storage drives researcher to continually search for ways to increase data rate and data capacity. As a result, researcher are continually seeking means for increasing the magnetoresistive performance of magnetic sensors. Such an increase in performance allow sensors to be constructed smaller resulting in decreased bit length and track width while still producing a useable magnetic signal from the ever smaller magnetic bits of data.

Therefore, there is a need for a way to increase the magnetic performance such as DR/R of a magnetoresistive sensor. Such an increase would preferably not require significant additional manufacturing complexity, and would preferably result in increased throughput and reduced scrap rate.

SUMMARY OF THE INVENTION

The present invention provides magnetoresistive sensor having improved magnetic properties. The sensor includes a cap layer that includes Ta and N. The N in the cap layer can be provided by depositing the Ta cap in a sputter deposition chamber having a desired amount of N in an Ar atmosphere.

The sensor may also include seed layers which may be a layer of NiFeCr and a layer of NiFe formed over the alumina substrate. The seed layers, such as the later deposited NiF may also be nitrogenated by depositing a small amount of N after depositing the seed layers.

The amount of N deposited onto the thin upper layer of the substrate is preferably not enough to constitute a layer of N, the amount of N being no greater than a couple of monolayers. The amount of N is preferably even less than a couple of monolayers, and is preferably less than a monolayer, consisting of a scattering of N atoms across the surface of the alumina substrate.

The presence of N beneficially affects the surface structure of the substrate, and advantageously causes the later deposited sensor layers, such as the AFM layer, to have an improved grain structure an improved magnetic properties. The presence of N within the Ta cap layer improves specular scattering properties of the cap layer, and acts as a diffusion barrier, further improving sensor performance.

A sensor having the improved nitrogenated substrate and nitrogenated cap layer has shown significant performance enhancement of about 8 percent as compared with prior art sensors.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
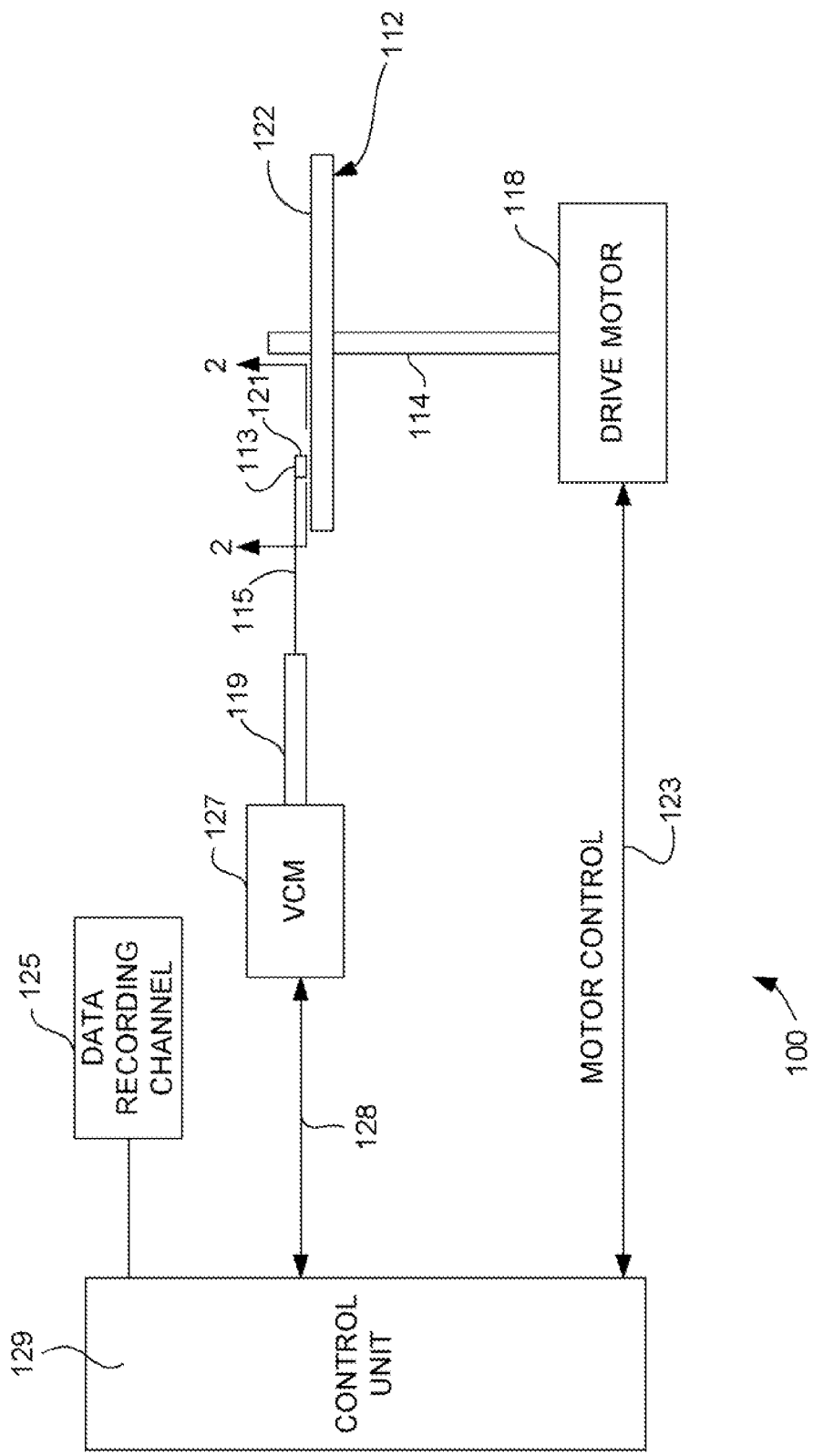
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
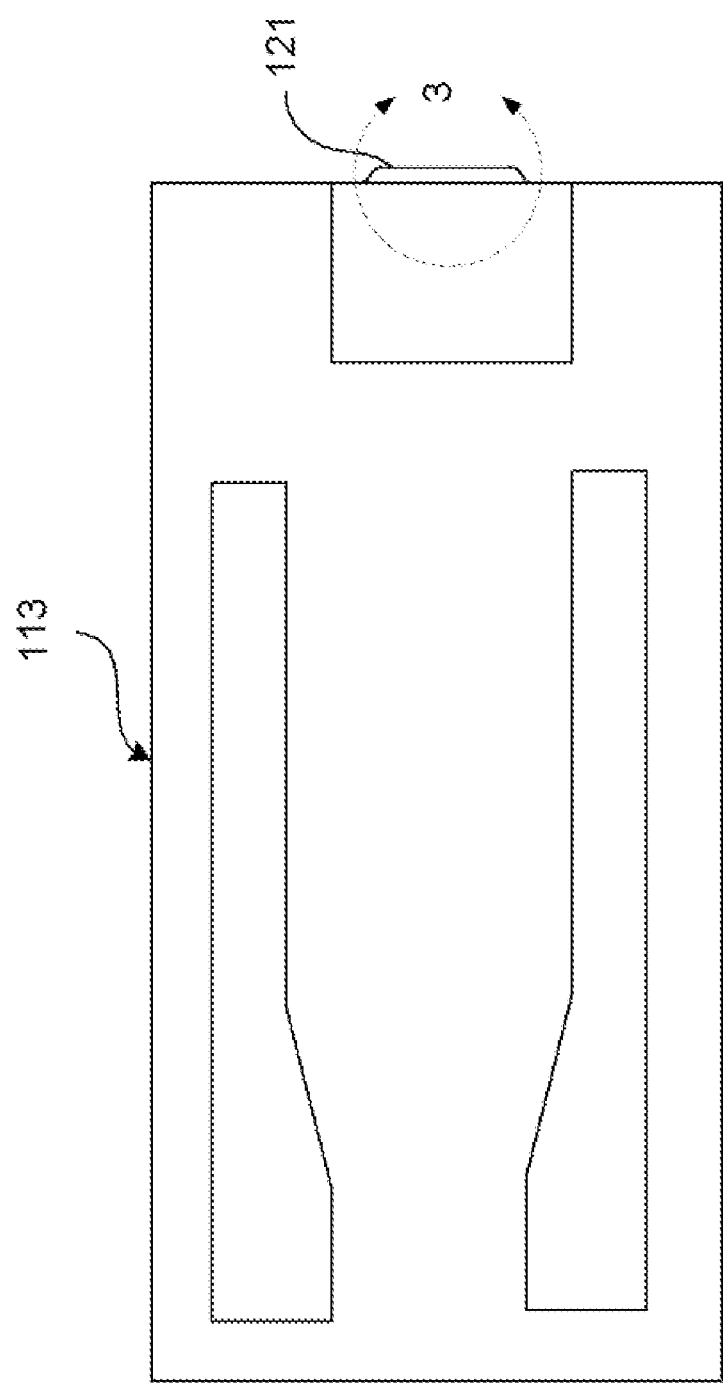
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
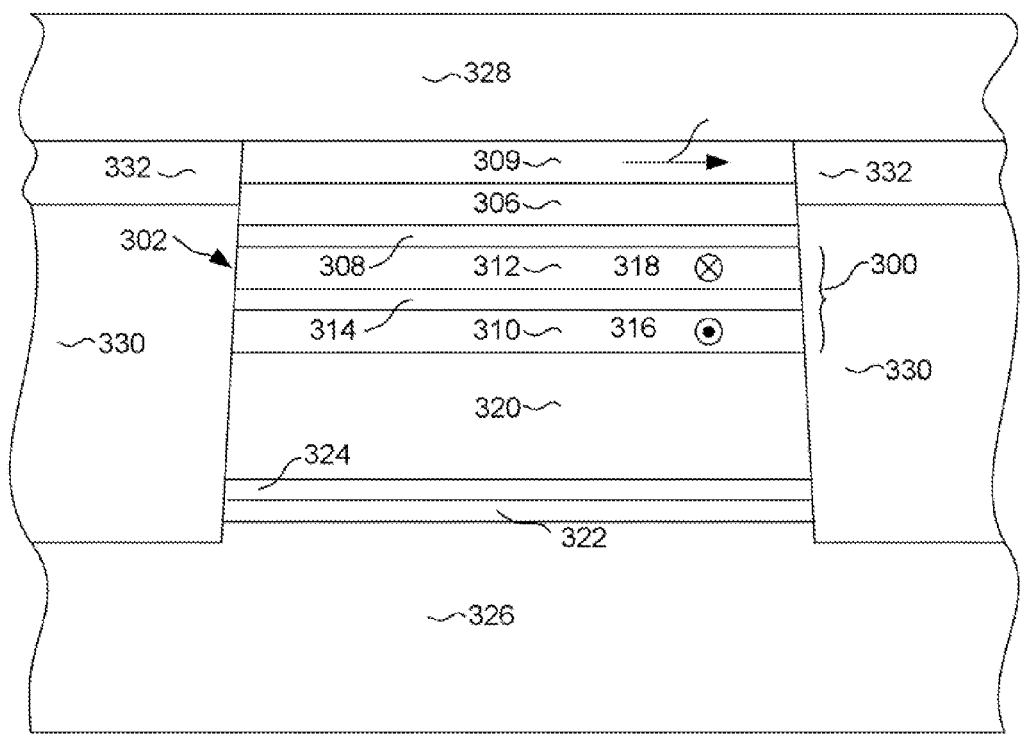
FIG. 3 is an ABS view of a magnetic sensor according to an embodiment of the present invention taken from circle 3 of FIG. 2 and rotated 90 degrees counterclockwise.

With reference now to FIG. 3, a magnetoresistive sensor 300 according to an embodiment of the invention includes a sensor stack 302. The sensor stack includes a magnetically pinned layer 304, a magnetically free layer 306 and a non-magnetic, electrically conductive spacer layer 308 sandwiched therebetween. It should be pointed out that although the sensor is being described in terms of a GMR sensor, it could also be a tunnel valve (TMR) sensor, in which case the spacer layer 308 would be a non-magnetic, electrically insulating material. A cap layer 309, which will be described in greater detail herein below is provide at the top of the sensor and protects the sensor from damage, such as by corrosion, during manufacturing.

The pinned layer 304, may be one of several types of pinned layers, such as a simple pinned, AP pinned, self pinned or AFM pinned sensor. For purposes of simplicity, the sensor will be described herein as an AP pinned, AFM pinned sensor having an AP1 layer 310, AP2 layer 312, and a non-magnetic, AP coupling layer, such as Ru 314 sandwiched therebetween. The AP1 and AP2 layers 312, 314 can be constructed of several magnetic materials such as, for example NiF or CoFe, and have magnetic moments 316, 318 that are pinned by exchange coupling of the AP1 layer 314 with a layer of antiferromagnetic material (AFM layer) 320 such as PtMn.

The AFM layer 320 is preferably built upon a pair of seed layers 322, 324. The first seed layer 322, may be for example NiFeCr, and the second seed layer 324 can be for example NiFe. The seed layers are beneficial in promoting a desired grain structure in the AFM layer 320 formed thereabove. This grain structure substantially carries through to the other magnetic layers formed above the AFM layer 320 as well. The grain structure of a magnetic material in a magnetoresistive sensor greatly affects the magnetic properties of the layers and, therefore, greatly affects the performance of the sensor. The present invention addresses performance improvement through grain structure enhancement, as will be described in more detail below.

The sensor 300 may also include first and second hard bias layers 330, constructed of a hard (high coercivity) magnetic material such as CoPtCr. An in stack bias structure (not shown) may be used in lieu of the hard bias layers 330. The hard bias 330 are preferably thick enough to extend at least to the level of the free layer. The sensor 300 also includes first and second non-magnetic, electrically conductive leads 332, formed over the hard bias layer 330, which conduct sense current to the sensor stack 302. The leads 332 can be for example Cu, Ta, Au or some other non-magnetic, electrically conductive material.

With continued reference to FIG. 3, the seed layers 322, 324 sit upon a first gap layer 326, which may be for example Alumina $Al_2O_3$, and acts as a substrate for the sensor layers deposited thereon. A second gap layer 328 is also formed at the top of the sensor and may also be constructed of $Al_2O_3$. The first and second gap layers 326, 328 electrically insulate the sensor, preventing current from being shunted around the sensor stack 302.

Figure 4:
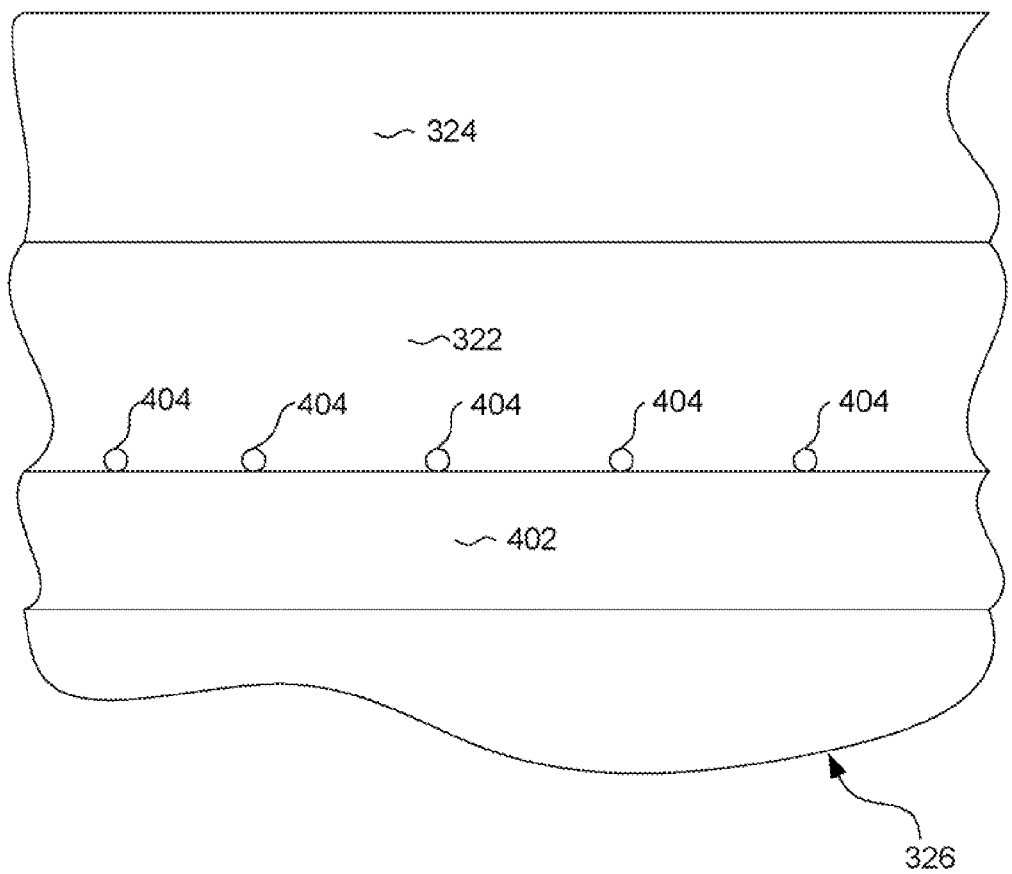
FIG. 4 is a view taken from circle 4 of FIG. 3, shown enlarged and illustrating a portion of the sensor of FIG. 3.

With reference now to FIG. 4, which shows an expanded view of a portion of the first gap layer 326 and the first and second seed layers 322, 324, the first gap layer 326 includes a very thin layer of alumina ($Al_2O_3$) 402 formed on the substrate/gap layer 326. This thin upper layer 402 may have a thickness of 20 to 40 Angstroms or about 30 Angstroms. The underlying gap layer 326 may have an amorphous structure. In other words, it is not crystalline. The thin alumina layer 402, by contrast has a desired crystalline structure, which imparts a desired grain structure on the later deposited seed layers 322, 324 and other sensor layers. The crystalline alumina layer 402 has an extremely smooth surface, which is generated by the inclusion of a very small amount of nitrogen N, in a novel nitrogen adsorption process that significantly improves the magnetic performance of the sensor.

With continued reference to FIG. 4, the very small amount of nitrogen 404 can be applied for example by atomic layer deposition, nitrogen exposure or adsorption of nitrogen. The amount of nitrogen is preferably too small to constitute and actual layer of N. The amount of nitrogen may be so small as to constitute a scattering of nitrogen atoms across the surface of the crystalline alumina layer 402, or may be enough to form one or two monolayers of nitrogen on all or a portion of the surface of the crystalline alumina layer 402. The thin crystalline alumina layer 402 can be deposited for example by atomic layer deposition. The presence of the N affects the structure of the surface of the alumina layer 402 and promotes an improved growth structure in a seed layers 322, 324 deposited thereon. This improved seed layer structure results in improved magnetic properties in the sensor layers deposited over the seed layer, thereby improving sensor performance.

The presence of the nitrogen 404 affects the growth of the seed layers 322, 324 and also therefore, advantageously affects the growth of the AFM layer 320. As another embodiment of the invention, one or more of the seed layers 322, 324 may be treated with nitrogen (ie. nitrogenated) as well as the alumina 326. The nitrogenation of the seed layers may in some circumstances provide additional improvement in the microstructure of the AFM 320.

With reference again to FIG. 3, the cap layer 309 preferably includes Ta having atoms of nitrogen interspersed therein. The nitrogen atoms may be introduced during deposition of the cap layer 309. For example, the cap layer 309 may be deposited by sputter deposition in a sputter deposition chamber. The sputter deposition chamber may include a Ta target and an atmosphere that includes Ar and N. The resulting cap layer resembles a laminated structure having different material compositions at various levels within the cap layer 309. The cap 309 is deposited on a magnetic layer such as the free layer 306, that has been exposed to oxygen. This results in the free layer 306 being, for example, NiFeO. As the Ta and N are deposited over the free layer the, the portion of the resulting cap layer 309 closest to the free layer pulls oxygen from the free layer 306 resulting in a first layer of the cap layer being TaNO. Subsequently deposited Ta and N, being further from the free layer does not include this oxygen and therefore is predominantly TaN, preferably having 30-50 atomic percent N or about 40 atomic percent N.

After the cap has been deposited, it is exposed to oxygen, either from the atmosphere or from direct oxygenation in a deposition chamber. This results in oxygen replacing the N in the top portion of the cap layer resulting in a top layer of TaO with little or no N. Therefore, the resulting cap 309 is a trilayer laminate structure. The first layer of the trilayer cap 309 is predominantly TaNO. The second or middle layer of the cap is TaN with 30-50 atomic percent N or about 40 atomic percent N. The third or top layer of the cap 309 is predominantly TaO, although trace amounts of N may be present. We have found that the above described cap structure 309 improves specular scattering properties of the cap layer 309 and significantly improves performance of the sensor 300.

The presence of nitrogen in the predominantly Ta cap 309 reduces the specular scattering of electrons passing through the cap 309. As those skilled in the art will appreciate, this reduction in spin dependent scattering through the cap layer 309 greatly improves the DR/R performance of the sensor. The cap 309 may be constructed so that a first deposited portion is exposed to $O_2$ (Ta+O) then a second deposited portion is exposed to $N_2$ (Ta+N), and then a third portion is again exposed to $O_2$ (Ta+O). The nitrogen treated cap layer 309 provides an improved diffusion barrier layer, resulting in less $O_2$ diffusion and therefore, less of a dead layer.

The present invention, having the novel nitrogen doped cap layer 309 and nitrogen adsorption treated alumina layer 402 has shown an 8 percent increase in DR. This is a very significant performance increase. What's more, this increase in DR was exhibited without affecting other sensor properties, so there is no negative trade off to constructing a sensor according to the present invention. The nitrogen treatment of the alumina substrate 326 results in improved PtMn crystalline structure. In fact we found that the nitrogenation of the alumina substrate has resulted in the complete elimination of undesirable 200 phase from the PtMn AFM layer 320. The invention can be quickly and easily incorporated into existing manufacturing processes as resulting in negligible downtime or increased cost. Sensor reliability has also been improved. The present invention also results in improved manufacturing yield due the improved control of the microstructure of the sensor 300.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor comprising:
   a magnetic pinned layer structure;
   a magnetic free layer structure;
   a non-magnetic layer sandwiched between the magnetic pinned layer structure and the magnetic free layer structure; and
   a cap layer comprising N disposed over the magnetic free layer structure, magnetic pinned layer structure and non-magnetic layer, wherein the cap layer comprises Ta and 30 to 50 atomic percent N.

2. A magnetoresistive sensor as in claim 1 wherein the cap layer comprises Ta having atoms of nitrogen interspersed therein.

3. A magnetoresistive sensor comprising:
   a magnetic pinned layer structure;
   a magnetic free layer structure;
   a non-magnetic layer sandwiched between the magnetic pinned layer structure and the magnetic free layer structure; and
   a cap layer comprising N disposed over the magnetic free layer structure, magnetic pinned layer structure and non-magnetic layer, wherein the cap layer comprises Ta and N and one or more layers comprising Ta and O.

4. A magnetoresistive sensor comprising:
   a magnetic pinned layer structure;
   a magnetic free layer structure;
   a non-magnetic layer sandwiched between the magnetic pinned layer structure and the magnetic free layer structure; and
   a cap layer comprising N disposed over the magnetic free layer structure, magnetic pinned layer structure and non-magnetic layer, wherein the cap layer further comprises:
   a first layer comprising TaNO;
   a second layer comprising TaN; and
   a third layer comprising TaO.

5. A magnetoresistive sensor comprising:
   a magnetic pinned layer structure;
   a magnetic free layer structure;
   a non-magnetic layer sandwiched between the magnetic pinned layer structure and the magnetic free layer structure; and
   a cap layer comprising N disposed over the magnetic free layer structure, magnetic pinned layer structure and non-magnetic layer, wherein the cap layer comprises Ta and N and has a composition that varies at different levels within the cap layer.

6. A magnetoresistive sensor comprising:
   a magnetic pinned layer structure;
   a magnetic free layer structure;
   a non-magnetic layer sandwiched between the magnetic pinned layer structure and the magnetic free layer structure; and
   a cap layer comprising N disposed over the magnetic free layer structure, magnetic pinned layer structure and non-magnetic layer, wherein the cap layer has a first level that comprises TaNO and a second level that comprises TaN.

7. A magnetoresistive sensor comprising:
   a magnetic pinned layer structure;
   a magnetic free layer structure;
   a non-magnetic layer sandwiched between the magnetic pinned layer structure and the magnetic free layer structure; and
   a cap layer comprising N disposed over the magnetic free layer structure, magnetic pinned layer structure and non-magnetic layer, wherein the cap layer has a first level that comprises TaNO and a second level that comprises TaNO with 30-50 atomic percent N.

8. A magnetoresistive sensor as in claim 7 wherein the first level of the cap layer is closest to the free layer.

9. A magnetoresistive sensor comprising:
   a magnetic pinned layer structure;
   a magnetic free layer structure;
   a non-magnetic layer sandwiched between the magnetic pinned layer structure and the magnetic free layer structure; and
   a cap layer comprising N disposed over the magnetic free layer structure, magnetic pinned layer structure and non-magnetic layer, wherein the cap layer has a variable composition having a first level closest to the free layer that comprises TaNO, a second layer comprising TaN and a third layer comprising TaO.

10. A method for manufacturing a magnetoresisive sensor, comprising
    depositing a magnetic pinned layer structure;
    depositing a non-magnetic layer over the magnetic pinned layer structure;
    depositing a magnetic free layer over the non-magnetic layer;
    exposing the free layer to oxygen; and
    depositing a cap layer in a deposition chamber using a Ta target in an atmosphere that includes N.

11. A method as in claim 10 wherein the atmosphere further comprises Ar.

12. A method for manufacturing a magnetoresisive sensor, comprising
    depositing a magnetic pinned layer structure;
    depositing a non-magnetic layer over the magnetic pinned layer structure;
    depositing a magnetic free layer over the non-magnetic layer;
    depositing a cap layer in a deposition chamber using a Ta target in an atmosphere that includes N; and
    after depositing the cap layer, exposing the cap layer to oxygen.

13. A method for manufacturing a magnetoresisive sensor, comprising
    depositing a magnetic pinned layer structure;
    depositing a non-magnetic layer over the magnetic pinned layer structure;
    depositing a magnetic free layer over the non-magnetic layer;
    depositing a cap layer in a deposition chamber using a Ta target in an atmosphere that includes N; and
    oxygenating the cap layer in the deposition chamber.

14. A method for manufacturing a magnetoresisive sensor, comprising
    depositing a magnetic pinned layer structure;
    depositing a non-magnetic layer over the magnetic pinned layer structure;
    depositing a magnetic free layer over the non-magnetic layer;
    depositing a cap layer in a deposition chamber using a Ta target in an atmosphere that includes N; and
    exposing the cap layer to atmospheric oxygen resulting in a top portion of the cap layer comprising TaO.

15. A method for manufacturing a magnetoresisive sensor, comprising
    depositing a magnetic pinned layer structure;
    depositing a non-magnetic layer over the magnetic pinned layer structure;
    depositing a magnetic free layer over the non-magnetic layer; and depositing a cap layer in a deposition chamber using a Ta target in an atmosphere that includes N, wherein the top portion of the cap layer includes trace amounts of N.

16. A method for manufacturing a magnetoresisive sensor, comprising depositing a magnetic pinned layer structure;

depositing a non-magnetic layer over the magnetic pinned layer structure;

depositing a magnetic free layer over the non-magnetic layer; and depositing a cap layer in a deposition chamber using a Ta target in an atmosphere that includes N, wherein a first portion of the cap layer is exposed to oxygen, a second portion of the cap layer is exposed to nitrogen and a third portion of the cap layer is exposed to oxygen.

17. A method for manufacturing a magnetoresisive sensor, comprising depositing a magnetic pinned layer structure;

depositing a non-magnetic layer over the magnetic pinned layer structure;

depositing a magnetic free layer over the non-magnetic layer; and depositing a cap layer in a deposition chamber using a Ta target in an atmosphere that includes N, wherein the first portion of the cap layer is deposited first, the second portion of the cap layer is exposed second and the third portion of the cap layer is exposed third.

\* \* \* \* \*